US012630714B2

(12) United States Patent
Bae et al.

(10) Patent No.: US 12,630,714 B2
(45) Date of Patent: May 19, 2026

(54) THERMOPLASTIC RESIN COMPOSITION AND MOLDED PRODUCT USING SAME

(71) Applicant: LOTTE CHEMICAL CORPORATION, Seoul (KR)

(72) Inventors: Yun Seok Bae, Uiwang-si (KR); Hyun Je Lee, Uiwang-si (KR); Kyun Ha Ban, Uiwang-si (KR); Young Sub Jin, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 548 days.

(21) Appl. No.: 18/022,809

(22) PCT Filed: Aug. 24, 2021

(86) PCT No.: PCT/KR2021/011300
§ 371 (c)(1),
(2) Date: Feb. 23, 2023

(87) PCT Pub. No.: WO2022/045736
PCT Pub. Date: Mar. 3, 2022

(65) Prior Publication Data
US 2023/0303838 A1      Sep. 28, 2023

(30) Foreign Application Priority Data
Aug. 31, 2020      (KR) ........................ 10-2020-0110620

(51) Int. Cl.
*C08L 77/06*          (2006.01)
*C08K 3/04*           (2006.01)
*C08K 7/06*           (2006.01)

(52) U.S. Cl.
CPC ................ *C08L 77/06* (2013.01); *C08K 3/04* (2013.01); *C08K 7/06* (2013.01); *C08K 2201/004* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 2004/0048981 A1 | 3/2004 | Park et al. | |
| 2006/0189747 A1* | 8/2006 | Joachimi ................ | C08L 77/02 524/514 |
| 2006/0247363 A1 | 11/2006 | Schwitzer et al. | |

FOREIGN PATENT DOCUMENTS

| | | |
|---|---|---|
| CN | 106566244 A | 4/2017 |
| CN | 106977911 A | 7/2017 |
| EP | 3858915 A1 | 8/2021 |
| JP | 2006-504833 | 2/2006 |
| KR | 10-2003-0007517 A | 1/2003 |
| KR | 10-0573558 B1 | 4/2006 |
| KR | 10-0643739 B1 | 11/2006 |
| KR | 10-1139827 B1 | 4/2012 |
| KR | 10-2019-0078735 A | 7/2019 |
| KR | 10-2020-0036594 A | 4/2020 |
| WO | 2022/045736 A1 | 3/2022 |

OTHER PUBLICATIONS

Office Action in counterpart Korean Patent Application No. 10-2020-0110620 dated May 16, 2023, pp. 1-6.
International Search Report in counterpart International Application No. PCT/KR2021/011300 dated Dec. 1, 2021, pp. 1-8.

* cited by examiner

*Primary Examiner* — Jeffrey D Washville
(74) *Attorney, Agent, or Firm* — Additon, Pendleton & Witherspoon, P.A.

(57) ABSTRACT

The present invention relates to a thermoplastic resin composition and a molded product using same, the thermoplastic resin composition comprising (F) 0.2-3 parts by weight of a polyamide-based flow enhancer on the basis of 100 parts by weight of a basic composition, which comprises: (A) 40-60 wt % of a polyamide resin; (B) 15-30 wt % of an acrylonitrile-butadiene-styrene copolymer resin having a rubber polymer average diameter of 1,000-5,000 nm; (C) 5-10 wt % of an ethylene-based copolymer containing an acid anhydride group; (D) 2-8 wt % of a maleimide-based copolymer; and (E) 10-30 wt % of a carbon fiber.

13 Claims, No Drawings

THERMOPLASTIC RESIN COMPOSITION AND MOLDED PRODUCT USING SAME

CROSS-REFERENCE TO RELATED APPLICATIONS

This application claims priority to and the benefit of International Application No. PCT/KR2021/011300, filed Aug. 24, 2021, which published as WO 2022/045736 on Mar. 3, 2022, and Korean Patent Application No. 10-2020-0110620, filed in the Korean Intellectual Property Office on Aug. 31, 2020, the entire disclosure of each of which is incorporated herein by reference.

TECHNICAL FIELD

The present invention relates to a thermoplastic resin composition and a molded product using the same.

BACKGROUND ART

In recent years, with development of automobile and IT industries, various studies have been actively conducted to replace materials including metals with plastic materials to achieve weight reduction, low manufacturing cost, improvement in design freedom, and simplification of a manufacturing process. A polyamide resin is one of the plastic materials for replacement of such metals and is widely used throughout the industry including the automobile industry due to excellent rigidity, toughness, abrasion resistance, chemical resistance, oil resistance, and reinforcing effects thereof.

In recent years, as the polyamide resin is applied to the automobile industry, electrical properties and flame retardancy are gradually required with the expansion of electric vehicles. Basically, since polymer materials are non-conductors unlike metals, static electricity can accumulate on the surface of automobile parts formed of the polymer materials, causing damage to electronic products inside the electric vehicle. Therefore, the polymer materials are required to have electrical conductivity, which is one of electrical characteristics, to compensate for this problem.

Moreover, electromagnetic wave shielding is also an important characteristic and there is a concern that electromagnetic waves can have harmful effects on the human body along with malfunction of various electronic products inside the electric vehicle. However, the polymer materials generally exhibit poor electromagnetic wave shielding performance. Therefore, the polymer materials are also required to have electromagnetic wave shielding performance.

Moreover, with the expansion of electric vehicles, the polymer materials are required to have flame retardancy. Batteries of the electric vehicles can ignite under certain circumstances and the polymer materials are generally flammable unlike metals. Accordingly, there is a concern that a fire can cause a serious situation. Therefore, there is a need for development of a polymer material ensuring electric conductivity, electromagnetic wave shielding performance, and flame retardancy for the purpose of weight reduction of automobiles.

On the other hand, carbon fibers can be used in an interior material inside the electric vehicle to impart electromagnetic wave shielding performance. As the content of the carbon fibers increases, fluidity and formability of the interior material deteriorates, causing problems of adherence of the interior material to a mold during injection molding of the interior material and breakage during removal of the interior material from the mold. Therefore, there is a need for development of an interior material for automobiles, which can maintain good fluidity while ensuring electromagnetic wave shielding performance.

DISCLOSURE

Technical Problem

It is an object of the present invention to provide a thermoplastic resin composition, which exhibits good properties in terms of electromagnetic wave shielding performance, impact resistance, fluidity, heat resistance, tensile strength and flexural modulus, and a molded product using the same.

Technical Solution

In accordance with one aspect of the present invention, there is provided a thermoplastic resin composition including: 100 parts by weight of a base composition comprising 40 wt % to 60 wt % of (A) a polyamide resin, 15 wt % to 30 wt % of (B) an acrylonitrile-butadiene-styrene copolymer resin containing a rubber polymer having an average particle diameter of 1,000 nm to 5,000 nm, 5 wt % to 10 wt % of (C) an acid anhydride-containing ethylene-based copolymer, 2 wt % to 8 wt % of (D) a maleimide-based copolymer, and 10 wt % to 30 wt % of (E) carbon fibers; and 0.2 to 3 parts by weight of (F) a polyamide-based fluidity-enhancing agent.

The polyamide resin (A) may include at least one selected from the group consisting of polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, polyamide 66/12/6I, and combinations thereof.

The acrylonitrile-butadiene-styrene copolymer resin (B) containing a rubber polymer having an average particle diameter of 1,000 nm to 5,000 nm may include: a dispersed phase of a core-shell structure including a core composed of a butadiene-based rubber polymer and a shell formed through graft polymerization of acrylonitrile and styrene to the core; and a styrene-acrylonitrile copolymer continuous phase.

A styrene-acrylonitrile copolymer constituting the styrene-acrylonitrile copolymer continuous phase may include a non-branched linear styrene-acrylonitrile copolymer.

The dispersed phase of the core-shell structure may be present in an amount of 10 wt % to 30 wt % and the styrene-acrylonitrile copolymer continuous phase may be present in an amount of 70 wt % to 90 wt %, based on 100 wt % of the acrylonitrile-butadiene-styrene copolymer resin (B) containing a rubber polymer having an average particle diameter of 1,000 nm to 5,000 nm.

The acid anhydride-containing ethylene-based copolymer (C) may be a maleic anhydride-grafted ethylene-$C_1$ to $C_{10}$ alkene copolymer.

The acid anhydride-containing ethylene-based copolymer (C) may be a maleic anhydride-grafted ethylene-octene copolymer.

The maleimide-based copolymer (D) may be an N-phenyl maleimide-styrene-maleic anhydride copolymer.

The maleimide-based copolymer (D) may have a glass transition temperature (Tg) of 150° C. to 200° C.

The carbon fibers (E) may have a pre-processing average length of 1 mm to 20 mm.

The polyamide-based fluidity-enhancing agent (F) may be a dendritic polyamide-based polymer.

The thermoplastic resin composition may further include at least one additive selected from among a nucleating agent, a coupling agent, fillers, a plasticizer, a lubricant, a release agent, an antibacterial agent, a heat stabilizer, an antioxidant, an UV stabilizer, a flame retardant, an antistatic agent, an impact modifier, dyes, and pigments.

In accordance with another aspect of the present invention, there is provided a molded product produced from the thermoplastic resin composition according to the embodiments of the present invention.

Advantageous Effects

Since the thermoplastic resin composition according to the present invention has good properties in terms of electromagnetic wave shielding performance, impact resistance, fluidity, heat resistance, tensile strength and flexural modulus, the thermoplastic resin composition can be widely applied to molding of various products. In particular, the thermoplastic resin composition can be advantageously used as interior materials for electric vehicles.

BEST MODE

Hereinafter, embodiments of the present invention will be described in detail. It should be understood that the following embodiments are provided by way of illustration and the scope of the invention should be limited only by the appended claims and equivalents thereto.

Herein, "copolymerization" means block copolymerization or random copolymerization and "copolymer" means a block copolymer or a random copolymer.

Unless specifically stated otherwise, "average particle diameter" of a rubber polymer is a volume average diameter and means a Z-average particle diameter measured using a dynamic light scattering analyzer.

Unless specifically stated otherwise, "weight average molecular weight" is a value measured using a 1200 series gel permeation chromatography (GPC) system (Agilent Technologies Inc.) after dissolving a powder specimen in tetrahydrofuran (THF).

According to one embodiment, there is provided a thermoplastic resin composition including: 100 parts by weight of a base composition comprising 40 wt % to 60 wt % of (A) a polyamide resin, 15 wt % to 30 wt % of (B) an acrylonitrile-butadiene-styrene copolymer resin containing a rubber polymer having an average particle diameter of 1,000 nm to 5,000 nm, 5 wt % to 10 wt % of (C) an acid anhydride-containing ethylene-based copolymer, 2 wt % to 8 wt % of (D) a maleimide copolymer, and 10 wt % to 30 wt % of (E) carbon fibers; and 0.2 to 3 parts by weight of (F) a polyamide-based fluidity-enhancing agent.

Hereinafter, each component of the thermoplastic resin composition will be described in detail.

(A) Polyamide Resin

In one embodiment, the polyamide resin may be selected from among various polyamide resins known in the art, and may include, for example, an aromatic polyamide resin, an aliphatic polyamide resin, or a mixture thereof, without being limited thereto.

The aromatic polyamide resin is a polyamide containing an aromatic group in the main chain thereof and may be a semi-aromatic polyamide.

The semi-aromatic polyamide means a polyamide containing at least one aromatic unit and at least one non-aromatic unit between amide bonds. For example, the semi-aromatic polyamide may be a polymer of an aromatic diamine and an aliphatic dicarboxylic acid, or a polymer of an aliphatic diamine and an aromatic dicarboxylic acid.

The aliphatic polyamide means a polymer of an aliphatic diamine and an aliphatic dicarboxylic acid.

Examples of the aromatic diamine may include p-xylene diamine and m-xylene diamine, without being limited thereto. These may be used alone or as a mixture thereof.

Examples of the aromatic dicarboxylic acid may include phthalic acid, isophthalic acid, terephthalic acid, naphthalene-2.6-dicarboxylic acid, diphenyl-4.4'-dicarboxylic acid, and 1,3-phenylenedioxydiacetic acid, without being limited thereto. These may be used alone or as a mixture thereof.

Examples of the aliphatic diamine may include 1,2-ethylene diamine, 1,3-propylene diamine, 1,6-hexamethylene diamine, 1,12-dodecylene diamine, and piperazine, without being limited thereto. These may be used alone or as a mixture thereof.

Examples of the aliphatic dicarboxylic acid may include adipic acid, sebacic acid, succinic acid, glutaric acid, azelaic acid, dodecanedioic acid, dimer acid, and cyclohexane dicarboxylic acid, without being limited thereto. These may be used alone or as a mixture thereof.

In one embodiment, the polyamide resin may be at least one selected from the group consisting of polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, polyamide 66/12/6I, and combinations thereof.

In one embodiment, the polyamide resin may be present in an amount of 40 wt % to 60 wt %, for example, 45 wt % to 60 wt %, for example, 50 wt % to 60 wt %, for example, 55 wt % to 60 wt %, for example, 40 wt % to 55 wt %, for example, 40 wt % to 50 wt %, for example, 40 wt % to 45 wt %, or for example, 45 wt % to 55 wt %, based on 100 wt % of the base composition.

Within this range of the polyamide resin, the thermoplastic resin composition and a molded product using the same can exhibit good properties caused by the polyamide resin in terms of rigidity, toughness, wear resistance, chemical resistance, and oil resistance.

If the content of the polyamide resin is less than 40 wt %, it is difficult to obtain good properties caused by the polyamide resin, and if the content of the polyamide resin exceeds 60 wt %, it is difficult to secure a reinforcing effect of a fiber reinforcing material, thereby causing deterioration in mechanical strength and/or heat resistance of the thermoplastic resin composition and a molded product using the same.

(B) Acrylonitrile-Butadiene-Styrene Copolymer Resin

In one embodiment, the acrylonitrile-butadiene-styrene copolymer resin (B), which contains a rubber polymer having an average particle diameter of 1,000 nm to 5,000 nm, may include a dispersed phase of a core-shell structure, which includes a core composed of a butadiene-based rubber polymer and a shell formed through graft polymerization of acrylonitrile and styrene to the core, and a styrene-acrylonitrile copolymer continuous phase.

In one embodiment, the acrylonitrile-butadiene-styrene copolymer resin imparts good impact resistance to the thermoplastic resin composition.

The acrylonitrile-butadiene-styrene copolymer resin may be prepared through emulsion, suspension, or bulk polymerization of three components including a butadiene-based rubber polymer, acrylonitrile, and styrene.

The styrene-acrylonitrile copolymer constituting the styrene-acrylonitrile copolymer continuous phase may be a non-branched linear styrene-acrylonitrile copolymer.

The butadiene-based rubber polymer may be selected from the group consisting of a butadiene rubber polymer, a butadiene-styrene rubber polymer, a butadiene-acrylonitrile rubber polymer, a butadiene-acrylate rubber polymer, and mixtures thereof.

In the acrylonitrile-butadiene styrene copolymer resin, the rubber polymer may have an average particle diameter of, for example, 1,000 nm to 5,000 nm, for example, 1,000 nm to 4,000 nm, or for example, 1,000 nm to 3,000 nm. If the average particle diameter of the rubber polymer is less than 1,000 nm, the thermoplastic resin composition cannot achieve good electromagnetic wave shielding performance and good fluidity.

The non-branched linear styrene-acrylonitrile copolymer formed in a continuous phase may have a weight average molecular weight of, for example, 50,000 g/mol to 250,000 g/mol, for example, 50,000 g/mol to 200,000 g/mol, or for example, 100,000 g/mol to 200,000 g/mol.

Based on 100 wt % of the base composition, the acrylonitrile-butadiene-styrene copolymer resin may be present in an amount of 15 wt % or more, for example, 30 wt % or less, for example, 25 wt % or less, for example, 15 wt % to 30 wt %, or for example, 15 wt % to 25 wt %.

Based on 100 wt % of the acrylonitrile-butadiene-styrene copolymer resin, the dispersed phase of the core-shell structure may be present in an amount of 10 wt % to 30 wt % and the continuous phase of the styrene-acrylonitrile copolymer (non-branched linear styrene-acrylonitrile copolymer) may be present in an amount of 70 wt % to 90 wt %.

In the base composition of the thermoplastic resin composition, if the content of the acrylonitrile-butadiene-styrene copolymer resin is less than 15 wt %, the thermoplastic resin composition can suffer from deterioration in impact resistance, and if the content of the acrylonitrile-butadiene-styrene copolymer resin exceeds 30 wt %, the thermoplastic resin composition can suffer from deterioration in heat resistance.

(C) Acid Anhydride-Containing Ethylene-Based Copolymer

In one embodiment, the acid anhydride-containing ethylene-based copolymer serves to improve impact resistance of the thermoplastic resin composition.

The acid anhydride-containing ethylene-based copolymer (C) may be a maleic anhydride-grafted ethylene-$C_1$ to $C_{10}$ alkene copolymer.

The $C_1$ to $C_{10}$ alkene monomer may be ethylene, propylene, 1-butene, 2-butene, 1-pentene, 2-pentene, 1-hexene, 2-hexene, 3-hexene, 4-hexene, heptene, octene, nonene, or decene, without being limited thereto.

Specifically, the acid anhydride-containing ethylene-based copolymer (C) may be a maleic anhydride-grafted ethylene-octene copolymer.

The acid anhydride-containing ethylene-based copolymer (C) may be present in an amount of 5 wt % to 10 wt %, for example, 6 wt % to 10 wt %, for example, 7 wt % to 10 wt %, for example, 5 wt % to 9 wt %, for example, 5 wt % to 8 wt %, or for example, 5 wt % to 7 wt %, based on 100 wt % of the base composition. If the content of the acid anhydride-containing ethylene-based copolymer (C) is less than 5 wt %, the thermoplastic resin composition can suffer from deterioration in impact resistance, and if the content of the acid anhydride-containing ethylene-based copolymer (C) exceeds 10 wt %, the thermoplastic resin composition can suffer from deterioration in processability upon molding.

(D) Maleimide-Based Copolymer

In one embodiment, the maleimide-based copolymer serves to impart good heat resistance to the thermoplastic resin composition. The maleimide-based copolymer may be a ternary copolymer of N-phenyl maleimide, styrene and maleic anhydride, and may be prepared through imidization of styrene and the maleic anhydride copolymer.

In one embodiment, the N-phenyl maleimide derivatives may be present in an amount of 10 wt % to 55 wt %, for example, 15 wt % to 55 wt %, or for example, 15 wt % to 50 wt %, based on 100 wt % of the maleimide copolymer.

In one embodiment, the styrene may be present in an amount of 40 wt % to 80 wt % based on 100 wt % of the maleimide-based copolymer, and the maleic anhydride may be present in an amount of 1 wt % to 10 wt %.

In the maleimide-based copolymer, if the content of the N-phenyl maleimide derivatives is less than 10 wt %, it is difficult to achieve the effect of improving heat resistance by the maleimide-based copolymer, and if the content of the N-phenyl maleimide derivatives exceeds 55 wt %, the thermoplastic resin composition and a molded product using the same can suffer from significant deterioration in external appearance.

The maleimide-based copolymer may have a glass transition temperature (Tg) of, for example, 150° C. to 200° C., for example, 160° C. to 200° C., or for example, 170° C. to 200° C.

The maleimide-based copolymer may be present in an amount of 2 wt % to 8 wt %, for example, 3 wt % to 8 wt %, for example, 4 wt % to 8 wt %, for example, 2 wt % to 7 wt %, for example, 2 wt % to 6 wt %, for example, 2 wt % to 5 wt %, based on 100 wt % of the base composition.

Within this range of the maleimide-based copolymer in the base composition, the thermoplastic resin composition can achieve significant improvement in heat resistance while maintaining balance with other properties including mechanical properties, formability, and the like, and a molded product produced therefrom can also exhibit good heat resistance.

(E) Carbon Fibers

According to the present invention, the carbon fibers serve to impart electrical conductivity and electromagnetic wave shielding performance to the thermoplastic resin composition including the polyamide resin (A), the acrylonitrile-butadiene-styrene copolymer resin (B), the acid anhydride-containing ethylene-based copolymer (C), and the maleimide-based copolymer (D).

Specifically, the carbon fibers may be dispersed at a certain location inside the thermoplastic resin composition to form a conductive network of the dispersed carbon fibers when a certain amount or more of the carbon fibers is present. The conductive network can impart electrical properties, for example, electrical conductivity and electromagnetic wave shielding performance, to the thermoplastic resin composition according to the embodiment of the invention.

The carbon fibers may have a pre-processing average length of 1 mm to 20 mm, for example, 3 mm to 15 mm. If the pre-processing average length of the carbon fibers is less than 1 mm, there is a high possibility of electrical discon-
nection between the carbon fibers in the thermoplastic resin
composition, and if the pre-processing average length of the
carbon fibers exceeds 20 mm, it is difficult to produce a
molded product using a typical extrusion method.

The carbon fibers may be present in an amount of 10 to
30 wt %, for example, 15 wt % to 30 wt %, for example, 20
wt % to 30 wt %, for example, 25 wt % to 30 wt %, for
example, 10 wt % to 25 wt %, for example, 10 wt % to 20
wt %, for example, 10 wt % to 15 wt %, for example, 10 wt
% to 25 wt %, for example, 10 wt % to 20 wt %, or for
example, 10 wt % to 15 wt %, based on the total weight of
the base composition.

If the content of the carbon fibers is less than 10 wt %
based on the total weight of the base composition, it is
difficult for the thermoplastic resin composition to exhibit
suitable levels of electrical conductivity and electromagnetic
wave shielding performance, and if the content of the carbon
fibers exceeds 30 wt %, the thermoplastic resin composition
can suffer from deterioration in impact resistance and form-
ability.

(F) Polyamide-Based Fluidity-Enhancing Agent

As described above, the thermoplastic resin composition
including the polyamide resin may include the carbon fibers
to impart electromagnetic wave shielding performance to the
thermoplastic resin composition.

If the thermoplastic resin composition includes an excess
of the carbon fibers in order to secure electromagnetic wave
shielding performance, the thermoplastic resin composition
can become relatively hard and can suffer from deterioration
in fluidity, causing problems of adherence of the composi-
tion to a mold during injection molding and breakage during
removal of the composition from the mold. The thermoplas-
tic resin composition may include a sufficient amount of the
carbon fibers to solve such problems and may further
include a polyamide-based fluidity-enhancing agent in order
to maintain a suitable level of fluidity while exhibiting good
formability, rigidity and dimensional stability.

The polyamide-based fluidity-enhancing agent may be a
dendritic polyamide-based polymer.

The dendritic polymer, that is, a dendrimer, is a macro-
molecule having a regular branched structure, and means a
polymer in which molecular chains are regularly spread
three-dimensionally from the center to the outside according
to a certain rule.

The polyamide-based fluidity-enhancing agent may be
present in an amount of, for example, 0.2 to 3 parts by
weight, for example, 0.2 to 2.5 parts by weight, for example,
0.2 to 2 parts by weight, for example, 0.5 to 3 parts by
weight, for example, 0.5 to 2.5 parts by weight, or for
example, 0.5 to 2 parts by weight, relative to 100 parts by
weight of the base composition. Within this range of the
polyamide-based fluidity-enhancing agent, the thermoplas-
tic resin composition can exhibit good fluidity and external
appearance while maintaining good mechanical properties
including impact resistance and the like.

(G) Other Additives

According to one embodiment, the thermoplastic resin
composition may further include at least one kind of additive
in addition to the components (A) to (F), as needed, in order
to achieve balance between properties or according to final
purposes of the thermoplastic resin composition, under
conditions that the thermoplastic resin composition main-
tains mechanical properties.

Specifically, the additive may include at least one selected
from the group consisting of a nucleating agent, a coupling
agent, fillers, a plasticizer, a lubricant, a release agent, an antibacterial agent, a heat stabilizer, an antioxidant, an UV
stabilizer, a flame retardant, an antistatic agent, an impact
modifier, dyes, pigments, and combinations thereof.

These additives may be present in a suitable range not
causing deterioration in properties of the thermoplastic resin
composition, specifically in an amount of 20 parts by weight
or less relative to 100 parts by weight of the base compo-
sition, but is not limited thereto.

The thermoplastic resin composition according to the
present invention may be prepared by a typical method for
preparing a thermoplastic resin composition known in the
art.

For example, the thermoplastic resin composition accord-
ing to the present invention may be prepared in the form of
pellets by mixing the aforementioned components of the
present invention and other additives, followed by melt
extrusion in an extruder.

A molded product according to one embodiment of the
invention may be produced from the thermoplastic resin
composition described above.

The thermoplastic resin composition has good electro-
magnetic wave shielding performance while exhibiting good
properties in terms of impact resistance, fluidity, heat resis-
tance, tensile strength and flexural modulus. Accordingly,
the thermoplastic resin composition can be widely applied to
various products.

Particularly, the thermoplastic resin composition can be
advantageously applied to interior materials for electric
vehicles and the like.

Next, the present invention will be described in more
detail with reference to some examples. It should be under-
stood that these examples are provided for illustration only
and are not to be construed in any way as limiting the
invention.

Examples 1 to 3 and Comparative Examples 1 to 5

Thermoplastic resin compositions of Examples 1 to 3 and
Comparative Examples 1 to 5 were prepared by commonly
adding a typical antioxidant and a typical lubricant to the
components prepared in the content ratio as listed in Table
1.

In Table 1, the components (A), (B), (C), (D) and (E) are
present in a base composition and are represented in wt %
based on the total weight of the base composition, and the
component (F) is added to the base composition and is
represented in parts by weight relative to 100 parts by weight
of the base composition.

0.4 parts by weight of an antioxidant and 0.2 parts by
weight of a lubricant were commonly further added to the
compositions listed in Table 1, and mixed therewith under a
dry condition. The mixture was continuously supplied in a
quantitative manner to a twin-screw extruder (L/D=36,
Φ=45 mm), followed by melting and extrusion. Next, a
thermoplastic resin composition prepared in pellet form
through the twin-screw extruder was dried at about 100° C.
for about 4 hours, followed by injection molding at a
cylinder temperature of about 260° C. and a mold tempera-
ture of about 80° C. using a 150-ton injection molding
machine, thereby preparing a specimen for property mea-
surement and a 2 mm-thick flat specimen for measurement
of electromagnetic wave shielding performance.

TABLE 1

| | Example | | | Comparative Example | | | | |
|---|---|---|---|---|---|---|---|---|
| | 1 | 2 | 3 | 1 | 2 | 3 | 4 | 5 |
| (A) | 54 | 54 | 42 | 54 | 54 | 54 | 42 | 44 |
| (B) | 23 | 23 | 18 | 23 | 23 | — | 18 | — |
| (B') | — | — | — | — | — | 23 | — | — |
| (C) | 8 | 8 | 6 | 8 | 8 | 8 | 6 | 6 |
| (D) | 5 | 5 | 4 | 5 | 5 | 5 | 4 | — |
| (E) | 10 | 10 | 30 | 10 | 10 | 10 | 30 | 50 |
| (F) | 0.5 | 2.0 | 0.5 | — | 5.0 | 0.5 | — | 0.5 |

Each of the components listed in Table 1 is as follows.

(A) Polyamide Resin

Polyamide 6 having a melting point of about 224° C. and a relative viscosity of about 2.5 (RV 2.5, KP ChemTech Co., Ltd.) was used.

(B) Acrylonitrile-Butadiene-Styrene Copolymer Resin

An acrylonitrile-butadiene-styrene copolymer resin containing about 11 wt % of a dispersed phase of a core-shell structure, which includes a core composed of a butadiene rubber polymer having an average particle diameter of about 2,000 nm and a shell composed of a styrene-acrylonitrile copolymer, and about 89 wt % of a dispersed phase of a styrene-acrylonitrile copolymer (weight average molecular weight: about 200,000 g/mol, non-branched linear styrene-acrylonitrile copolymer) (ABS 275, Liaoning Huajin Chemical Co., Ltd.) was used.

(B') Acrylonitrile-Butadiene-Styrene Graft Copolymer

An acrylonitrile-butadiene-styrene graft copolymer including 58 wt % of a core composed of a butadiene rubber polymer having an average particle diameter of about 250 nm and a shell formed through graft polymerization of acrylonitrile and styrene to the core (Lotte Chemical Corp.) was used.

(C) Acid Anhydride-Containing Ethylene-Based Copolymer

A maleic anhydride-grafted ethylene-octene copolymer (Fusabond® MN 493D, DuPont) was used.

(D) Maleimide-Based Copolymer

An N-phenyl maleimide-styrene-maleic anhydride copolymer (glass transition temperature (Tg): about 195° C.) (Denka IP MS-NA, Denka) was used.

(E) Carbon Fiber

Carbon fibers having an average length of about 6 mm (SIGRAFIL® C C6-4.0/240-T130, SGL Carbon Co., Ltd.) were used.

(F) Polyamide-Based Fluidity-Enhancing Agent

CYD-701 (Weihai CY Dendrimer Technology Co., Ltd.) was used.

Experimental Example

The following experimental results are shown in Table 2.

(1) Electromagnetic wave shielding performance (unit: dB): Electromagnetic wave shielding performance of each specimen was measured in a frequency range of 8.2 GHz to 12.4 GHz using a WR-90 waveguide and an ENA vector network analyzer in accordance with ASTM D4935-99.

(2) Impact resistance (unit: kgf·cm/cm): Notched Izod impact strength was measured on a ⅛" thick specimen at room temperature in accordance with ASTM D256.

(3) Fluidity (unit: g/10 min): Melt flow index was measured at 250° C. under a load of 10 kg in accordance with ASTM D1238.

(4) Heat resistance (unit: ° C.): Heat deflection temperature (HDT) was measured under a load of 1.8 MPa in accordance with ASTM D648.

(5) Tensile strength (unit: kgf/cm$^2$): Tensile strength was measured on a ⅛" thick specimen at 50 mm/min in accordance with ASTM D638.

(6) Flexural modulus (unit: kgf/cm$^2$): Flexural modulus was measured on a ¼" thick specimen at 2.8 mm/min in accordance with ASTM D790.

TABLE 2

| | Example | | | Comparative Example | | | | |
|---|---|---|---|---|---|---|---|---|
| | 1 | 2 | 3 | 1 | 2 | 3 | 4 | 5 |
| Electromagnetic wave shielding | 21.5 | 21.9 | 35.4 | 14.3 | 22.0 | 17.5 | 29.2 | 48.0 |
| Notched Izod impact strength | 8.6 | 8.0 | 12.2 | 10.1 | 7.0 | 12.0 | 9.4 | 10.4 |
| Melt flow index | 156.0 | 170.1 | 40.6 | 29.1 | 180.5 | 94.1 | 8.5 | 24.5 |
| HDT | 201.5 | 201.4 | 207.3 | 201.2 | 200.3 | 192.3 | 207.0 | 215.5 |
| Tensile strength | 1,260 | 1,250 | 1,720 | 1,280 | 1,240 | 980 | 1,790 | 2,640 |
| Flexural modulus | 68,600 | 68,400 | 105,000 | 68,900 | 68,000 | 55,000 | 107,000 | 218,000 |

It could be seen from Table 2 that the thermoplastic resin compositions of Examples 1 to 3 exhibited better electromagnetic wave shielding performance than the thermoplastic resin compositions of Comparative Examples 1 to 5 while maintaining good properties in terms of impact resistance, fluidity, heat resistance, tensile strength, and flexural modulus. Although some embodiments have been described above herein, it should be understood by those skilled in the art that the present invention is not limited thereto, and various modifications, changes, and alterations can be made without departing from the spirit and scope of the invention.

The invention claimed is:

1. A thermoplastic resin composition comprising:
100 parts by weight of a base composition comprising 40 wt % to 60 wt % of (A) a polyamide resin, 15 wt % to 30 wt % of (B) an acrylonitrile-butadiene-styrene copolymer resin containing a rubber polymer having an average particle diameter of 1,000 nm to 5,000 nm, 5 wt % to 10 wt % of (C) an acid anhydride-containing ethylene-based copolymer, 2 wt % to 8 wt % of (D) a maleimide-based copolymer, and 10 wt % to 30 wt % of (E) carbon fibers; and
0.2 to 3 parts by weight of (F) a polyamide-based fluidity-enhancing agent.

2. The thermoplastic resin composition according to claim 1, wherein the polyamide resin (A) comprises at least one selected from the group consisting of polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, polyamide 66/12/6I, and combinations thereof.

3. The thermoplastic resin composition according to claim 1, wherein the acrylonitrile-butadiene-styrene copolymer resin (B) containing a rubber polymer having an average particle diameter of 1,000 nm to 5,000 nm comprises:

a dispersed phase of a core-shell structure comprising a core composed of a butadiene-based rubber polymer and a shell formed through graft polymerization of acrylonitrile and styrene to the core; and a styrene-acrylonitrile copolymer continuous phase.

4. The thermoplastic resin composition according to claim 3, wherein a styrene-acrylonitrile copolymer constituting the styrene-acrylonitrile copolymer continuous phase comprises a non-branched linear styrene-acrylonitrile copolymer.

5. The thermoplastic resin composition according to claim 3, wherein the dispersed phase of the core-shell structure is present in an amount of 10 wt % to 30 wt % and the styrene-acrylonitrile copolymer continuous phase is present in an amount of 70 wt % to 90 wt %, based on 100 wt % of the acrylonitrile-butadiene-styrene copolymer resin (B) containing a rubber polymer having an average particle diameter of 1,000 nm to 5,000 nm.

6. The thermoplastic resin composition according to claim 1, wherein the acid anhydride-containing ethylene-based copolymer (C) is a maleic anhydride-grafted ethylene-$C_1$ to $C_{10}$ alkene copolymer.

7. The thermoplastic resin composition according to claim 1, wherein the acid anhydride-containing ethylene-based copolymer (C) is a maleic anhydride-grafted ethylene-octene copolymer.

8. The thermoplastic resin composition according to claim 1, wherein the maleimide-based copolymer (D) is an N-phenyl maleimide-styrene-maleic anhydride copolymer.

9. The thermoplastic resin composition according to claim 1, wherein the maleimide-based copolymer (D) has a glass transition temperature (Tg) of 150° C. to 200° C.

10. The thermoplastic resin composition according to claim 1, wherein the carbon fibers (E) have a pre-processing average length of 1 mm to 20 mm.

11. The thermoplastic resin composition according to claim 1, wherein the polyamide-based fluidity-enhancing agent (F) is a dendritic polyamide polymer.

12. The thermoplastic resin composition according to claim 1, further comprising: at least one additive selected from the group consisting of nucleating agents, coupling agents, fillers, plasticizers, lubricants, release agents, antibacterial agents, heat stabilizers, antioxidants, UV stabilizers, flame retardants, antistatic agents, impact modifiers, dyes, pigments, and combinations thereof.

13. A molded product produced from the thermoplastic resin composition according to claim 1.

* * * * *